(12) United States Patent
Amorim Torres et al.

(10) Patent No.: US 12,395,111 B2
(45) Date of Patent: Aug. 19, 2025

(54) OVERVOLTAGE MITIGATION SYSTEM

(71) Applicant: GM GLOBAL TECHNOLOGY OPERATIONS LLC, Detroit, MI (US)

(72) Inventors: Renato Amorim Torres, Pontiac, MI (US); Suresh Gopalakrishnan, Troy, MI (US); Chandra S. Namuduri, Troy, MI (US); Yilun Luo, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 163 days.

(21) Appl. No.: 18/534,864

(22) Filed: Dec. 11, 2023

(65) Prior Publication Data

US 2025/0192714 A1 Jun. 12, 2025

(51) Int. Cl.
*H02M 3/158* (2006.01)
*H02P 27/06* (2006.01)
*H02P 29/024* (2016.01)

(52) U.S. Cl.
CPC .......... *H02P 29/0241* (2016.02); *H02P 27/06* (2013.01)

(58) Field of Classification Search
CPC .............................. H02P 29/0241; H02P 27/06
See application file for complete search history.

(56) References Cited

U.S. PATENT DOCUMENTS

| | | | | |
|---|---|---|---|---|
| 2005/0047040 A1* | 3/2005 | Naffziger | ................. | H03K 5/08 361/90 |
| 2009/0295224 A1* | 12/2009 | Kobayashi | .............. | B60L 50/40 307/9.1 |
| 2010/0096926 A1* | 4/2010 | King | ...................... | B60L 53/20 307/45 |
| 2017/0017209 A1* | 1/2017 | Yamamoto | ................ | H02P 3/02 |
| 2019/0186746 A1* | 6/2019 | Lowery | .................. | F02M 27/06 |
| 2022/0396156 A1* | 12/2022 | Cho | ....................... | H02M 7/219 |

\* cited by examiner

*Primary Examiner* — Muhammad S Islam
(74) *Attorney, Agent, or Firm* — Quinn IP Law

(57) ABSTRACT

An electric motor control system includes an alternating current (AC) electric motor having a first phase input, a second phase input, and a third phase input, and an AC electrical energy source having a first phase output, a second phase output and a third phase output. The system also includes conductors coupled between the phase outputs of the AC electrical energy source and the phase inputs of the AC electric motor. The electric motor control system also has circuitry that further includes a rectifier with phase inputs coupled to the conductors. The rectifier produces a rectified voltage between a positive rectifier output and a negative rectifier output. The system additionally includes an energy storage element coupled across the positive rectifier output and the negative rectifier output and a voltage limiting diode coupled to the positive rectifier output to limit a voltage of the positive rectifier output.

20 Claims, 5 Drawing Sheets

OVERVOLTAGE MITIGATION SYSTEM

INTRODUCTION

This disclosure is in the field of overvoltage mitigation in an alternating current (AC) electrical system.

In an AC electrical system, such as a powertrain of an electric vehicle, overvoltage transients may occur due, for example, by switching that may occur in an inverter that converts stored electrical energy into AC for propelling the electric vehicle. Effective methods of mitigating overvoltage transients in AC electrical systems may be advantageous.

SUMMARY

An electric motor control system includes an alternating current (AC) electric motor having a first phase input, a second phase input, and a third phase input, and an AC electrical energy source having a first phase output, a second phase output and a third phase output. The system also includes a first conductor coupled between the first phase output of the AC electrical energy source and the first phase input of the AC electric motor, a second conductor coupled between the second phase output of the AC electrical energy source and the second phase input of the AC electric motor, and a third conductor coupled between the third phase output of the AC electrical energy source and the third phase input of the AC electric motor. The electric motor control system also has circuitry that further includes a rectifier with a first rectifier phase input coupled to the first conductor, a second rectifier phase input coupled to the second conductor, and a third rectifier phase input coupled to the third conductor, the rectifier producing a rectified voltage between a positive rectifier output and a negative rectifier output. The system additionally includes an energy storage element coupled across the positive rectifier output and the negative rectifier output and at least one voltage limiting diode coupled to the positive rectifier output to limit a voltage of the positive rectifier output.

In the electric motor control system, the at least one voltage limiting diode may be coupled across the positive rectifier output and the negative rectifier output. Further, the at least one voltage limiting diode may include at least one transient-voltage-suppression (TVS) diode.

Additionally, the circuitry may include a transistor having a control input and configured to conduct current between the positive rectifier output and the negative rectifier output in response to a control voltage at the control input. The voltage limiting diode may be operative to provide control voltage to the control input. The circuitry may include a resistor through which the current is conducted. The control input may be a gate or a base of the transistor.

The AC electrical energy source may include a source of stored electrical energy and an inverter coupled to the source of electrical energy, and the circuitry may further comprise a fourth conductor coupled between a positive rail of the inverter and the positive rectifier output and a fifth conductor coupled between a negative rail of the inverter and the negative rectifier output.

A second motor control system includes an AC electric motor having a first phase input, a second phase input, and a third phase input, an AC electrical energy source having a first phase output, a second phase output and a third phase output, a first conductor coupled between the first phase output and the first phase input, a second conductor coupled between the second phase output and the second phase input, and a third conductor coupled between the third phase output and the third phase input. The system also includes first overvoltage mitigation circuitry coupled across the first conductor and the second conductor, second overvoltage mitigation circuitry coupled across the first conductor and the third conductor, and third overvoltage mitigation circuitry coupled across the second conductor and the third conductor.

In the second motor control system, the AC electrical energy source may further include a source of stored electrical energy and an inverter coupled to the source of stored electrical energy and having the first phase output, the second phase output, and the third phase output. The first overvoltage mitigation circuitry may include a first diode and a second diode, the first diode and the second diode coupled in series with each other and with opposing polarities to one another. The first and second diodes may be TVS diodes.

In the second electric motor control system, the first overvoltage mitigation circuitry may include a parallel connected resistor and inductor interposed in-line in the first conductor; and a capacitor coupled across the first conductor and the second conductor. The resistor, inductor, and capacitor may all be located closer to the inverter than to the AC electric motor.

In the second electric motor control system, the first overvoltage mitigation circuitry may be located closer to the AC electric motor than to the inverter. Further, the source of stored electrical energy may be a battery, and further may be a battery that stores electrical energy at a voltage of greater than or equal to 400 volts.

An electric vehicle includes an AC electric motor to propel the electric vehicle, the AC electric motor having three motor phase inputs, a source of stored electrical energy, and an inverter coupled to the source of stored electrical energy and to the AC electric motor to provide switched electrical energy from the source of stored electrical energy to the AC electric motor for propulsion of the electric vehicle. The electric vehicle also includes a first conductor coupled between a first phase output of the inverter and a first phase input of the AC electric motor, a second conductor coupled between a second phase output of the inverter and a second phase input of the AC electric motor, and a third conductor coupled between a third phase output of the inverter and a third phase input of the AC electric motor. The electric vehicle also includes circuitry that further includes a three-phase rectifier with a first rectifier phase input coupled to the first conductor, a second rectifier phase input coupled to the second conductor, and a third rectifier phase input coupled to the third conductor, the rectifier producing a rectified voltage between a positive rectifier output and a negative rectifier output. The electric vehicle additionally includes an energy storage element coupled across the positive rectifier output and the negative rectifier output, at least one voltage limiting diode coupled to the negative rectifier output to limit a voltage between the positive rectifier output and the negative rectifier output, and a transistor having a control input and configured to conduct current between the positive rectifier output and the negative rectifier output in response to a control voltage at the control input. The at least one voltage limiting diode is operative to provide control voltage to the control input.

The transistor may be a p-channel bipolar transistor or a p-channel MOSFET. The at least one voltage limiting diode may include a TVS diode or a Zener diode. Additionally, the circuitry may further include a resistor through which the current is conducted.

The above summary does not represent every embodiment or every aspect of this disclosure. The above-noted features and advantages of the present disclosure, as well as other possible features and advantages, will be readily apparent from the following detailed description of the embodiments and best modes for carrying out the disclosure when taken in connection with the accompanying drawings and appended claims. Moreover, this disclosure expressly includes combinations and sub-combinations of the elements and features presented above and below.

DETAILED DESCRIPTION

Figure 1:
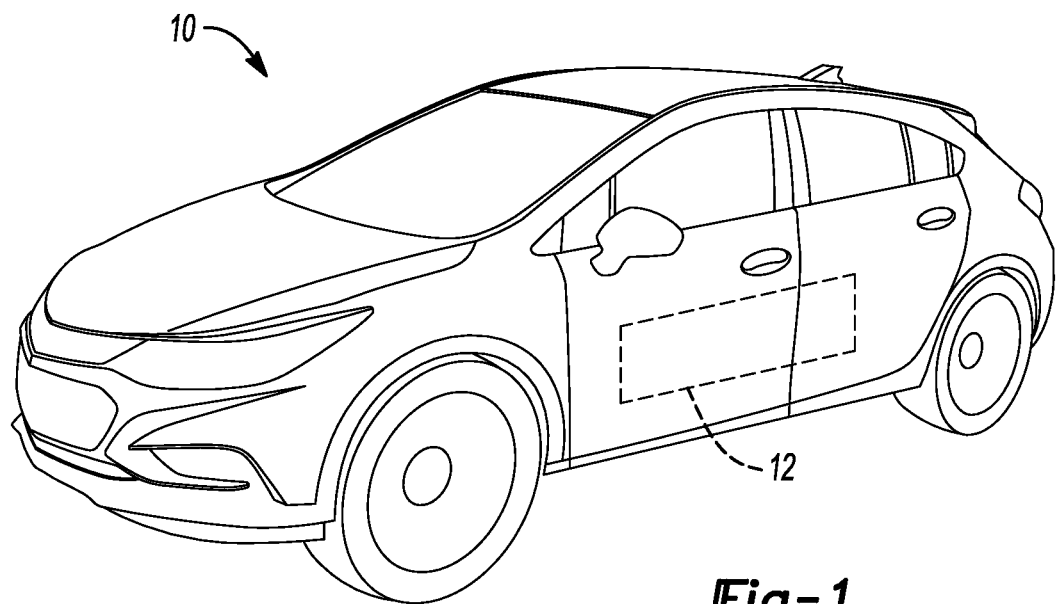
FIG. 1 illustrates an electric vehicle.

The present disclosure is susceptible of embodiment in many different forms. Representative examples of the disclosure are shown in the drawings and described herein in detail as non-limiting examples of the disclosed principles. To that end, elements and limitations described in the Abstract, Introduction, Summary, and Detailed Description sections, but not explicitly set forth in the claims, should not be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, "any" and "all" shall both mean "any and all", and the words "including", "containing", "comprising", "having", and the like shall mean "including without limitation". Moreover, words of approximation such as "about", "almost", "substantially", "generally", "approximately", etc., may be used herein in the sense of "at, near, or nearly at", or "within 0-5% of", or "within acceptable manufacturing tolerances", or logical combinations thereof.

Refer first to FIG. 1, where an electric vehicle 10 is illustrated. Electric vehicle 10 may be any vehicle that is propelled in whole in part using electrical energy and may include full-electric and hybrid-electric vehicles. Further, electric vehicle 10 may be any style of vehicle, such as a car, truck, van, sport-utility vehicle, motorcycle, bicycle, scooter, boat, aircraft, or the like.

Figure 2:
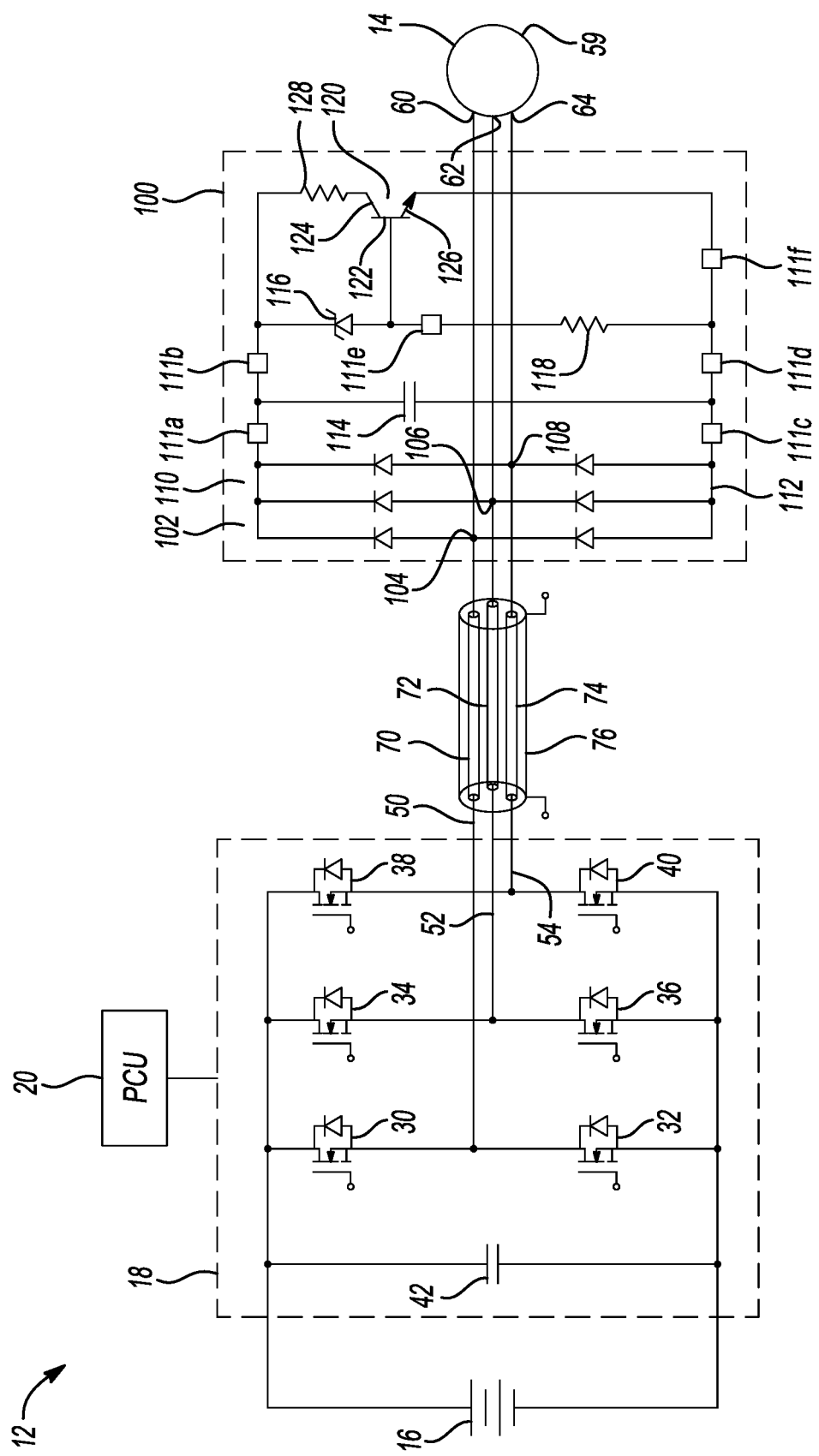
FIG. 2 illustrates a powertrain of the electric vehicle.

Referring additionally to FIG. 2, electric vehicle 10 has an electrical powertrain 12. Electrical powertrain 12 for electric vehicle 10 includes an electric motor 14. Electric motor 14 may be a three-phase alternating current (AC) electric motor. Electrical powertrain 12 also includes a battery pack 16, which is a source of stored electrical energy for propulsion of electric vehicle 10 by electric motor 14. Battery pack 16 is coupled to a power inverter module (PIM) 18. Battery pack 16 provides propulsive energy to electric motor 14, via switching performed within PIM 18 controlled by a powertrain control unit (PCU) 20. As such, battery pack 16 and PIM 18 may be referred to as a source of AC electrical energy. PCU 20 may be a standalone controller, may be integrated with PIM 18, or may be integrated with other controllers in the electrical system of electric vehicle 10. Electric vehicle 10 may be propelled by more than one electric motor.

PIM 18 may include six switching elements 30, 32, 34, 36, 38, and 40, the switching of which may be controlled by PCU 20 in the course of control of electric motor 14. The six switching elements may be insulated gate bipolar transistors (IGBTs), field-effect transistors (FETs) or other suitable transistors. PIM 18 may also have a direct-current (DC) link capacitor 42. PIM 18 may have three phase outputs, namely first phase output 50, second phase output 52, and third phase output 54.

PCU 20 is understood to be a controller that has sufficient electronic resources (e.g., microprocessor, memory, inputs, outputs, software, access to sensors) to perform control of electric motor 14.

Electric motor 14 may have a housing 59. Electric motor 14 may include three phase inputs, a first phase input 60, a second phase input 62, and a third phase input 64, as power inputs for use by electric motor 14 to provide propulsive energy for propelling electric vehicle 10.

The phase outputs of PIM 18 may be connected to the phase inputs of electric motor 14. Such connection may be by a first conductor 70 that conductively couples first phase output 50 and first phase input 60. The connection may also be by a second conductor 72 that conductively couples second phase output 52 and second phase input 62. The connection may also further be by a third conductor 74 that conductively couples third phase output 54 and third phase input 64. First conductor 70, second conductor 72, and third conductor 74 may be included within a multi-conductor cable that includes an electromagnetic shield 76. Alternatively or additionally, each of first conductor 70, second conductor 72 and third conductor 74 may have its own shield.

In referring to "conductors" herein, such reference is also understood to include conductive paths that may include multiple conductors that are themselves electrically coupled together, such as two or more individual conductors that are coupled together by one or more connectors, as may be done for convenience of assembly of electric vehicle 10.

Electrical powertrain 12 may employ electric motor 14 that operates at high voltages. In non-limiting examples, electric motor 14 may operate at, say, 400 volts or 800 volts. In motors operating at such voltages and where high speed switching by PIM 18 occurs, overvoltage conditions that stress the insulation within electric motor 14 may occur. Overvoltage at the terminals of electric motor 14 may be twice as much or more than the voltage of battery pack 16, depending in part on the length and electrical characteristics of the cable that contains first conductor 70, second conductor 72, and third conductor 76. That is, if battery pack 16 is charged to 400 volts, the overshoot at the terminals of electric motor 14 may be 800 volts or more; if battery pack 16 is charged to 800 volts, the overshoot at the terminals of electric motor 14 may be 1600 volts or more. High speed switching (that is, high dv/dt) may cause additional effects such as increased common mode currents and increased induced current in the bearings of electric motor 14 that may be detrimental to the durability of the drivetrain system of electric vehicle 10 by causing premature wear of electric motor 14 and the drivetrain components downstream of electric motor 14.

Electrical powertrain 12 may also include circuitry 100 that may serve as overvoltage suppression or overvoltage mitigation, or overvoltage filtering circuitry for the electrical energy that is conducted on first conductor 70, second conductor 72, and third conductor 74.

Circuitry 100 includes a rectifier 102, which may be a three-phase diode bridge rectifier. The diodes of rectifier 102 may be any diodes suitable for the purpose of voltage rectification, such as Schottky diodes. Rectifier 102 has a first rectifier phase input 104, a second rectifier phase input 106, and a third rectifier phase input 108. Rectifier 102 may also have a first rectifier output 110, which may be a positive rectifier output, and a second rectifier output 112, which may be a negative rectifier output. The result of rectification by rectifier 102 may be a direct-current (DC) voltage between first rectifier output 110 and second rectifier output 112. Further included in circuitry 100 is a capacitor 114, which may serve as an energy storage element.

Additionally included in circuitry 100 is a diode 116 coupled to first rectifier output 110. Diode 116 is also coupled to second rectifier output 112, via resistor 118. Diode 116 may be a voltage limiting or voltage clamping diode such as a transient-voltage-suppression (TVS) or Zener diode (or alternatively, a series connection of two or more voltage limiting or voltage clamping diodes, the series connection coupled to first rectifier output 110 and, via resistor 118, to second rectifier output 112). Coupled to the junction between diode 116 and resistor 118 is the base 122 of a transistor 120.

Transistor 120 may be any type of transistor that is suitable for the purpose described herein, such as a bipolar junction transistor (BJT), an insulated gate bipolar transistor (IGBT), field-effect transistor (FET), or a metal oxide semiconductor field-effect transistor (MOSFET). Base 122 may act as a control input of transistor 120; based on control voltage applied to base 122, transistor 120 may cause conduction between collector 124 and emitter 126 of transistor 120. If transistor 120 is an insulated gate bipolar transistor or a MOSFET, base 122 may instead be a gate of transistor 120.

Operation of circuitry 100 may be as follows. Rectifier 102 rectifies the three-phase voltages across first conductor 70, second conductor 72 and third conductor 74. If the resulting rectified voltage is high enough to represent an overvoltage condition of sufficient magnitude, diode 116 will conduct. This will act to limit, clamp, or suppress the voltage of first rectifier output 110. At the same time, transistor 120 will conduct, conducting current through resistor 128. This will act to dissipate electrical energy that has heretofore been stored in capacitor 114.

It should be noted that resistor 128 may be omitted, particularly in the event that transistor 120 has sufficient capacity to dissipate the electrical energy stored in capacitor 114. Also, resistor 128 may instead be connected between emitter 126 and second rectifier output 112, rather than between collector 124 and first rectifier output 110. In either event, current conducted through transistor 120 would be conducted through resistor 128.

Transistor 120 may act not solely as an "on-off" switch. Transistor 120, if a MOSFET for example, may act for substantial periods in its ohmic and/or saturation region and not merely in "on-off" fashion. Or transistor 120, if a bipolar junction transistor for example, may operate in its "linear" or "active" region, not only in cut-off and saturation.

A significant advantage of circuitry 100 is that, unless the voltage across first rectifier output 110 and second rectifier output 112 is sufficiently high due to an overvoltage condition on first conductor 70, second conductor 72, and third conductor 74, capacitor 114 will simply act as electrical energy storage, without energy dissipation. This is helpful for the efficiency of electric vehicle 10. However, when the voltage across first rectifier output 110 and second rectifier output 112 is sufficiently high, due to overvoltage among first conductor 70, second conductor 72, and third conductor 74, circuitry 100 will act to dissipate the energy embodied in that overvoltage condition.

A further significant advantage of circuitry 100 is that due to diode 116, the voltage across positive rectifier first output 110 and second rectifier output 112 will be regulated or clamped at a very consistent voltage, making the overvoltage suppression or mitigation function of circuitry 100 very consistent, predictable, precise and reliable. Diode 116 may be selected to conduct at a voltage value that prevents an overvoltage condition significant enough to damage or degrade electric vehicle 10 or components thereof. At the same time, diode 116 may be selected to conduct at a high enough voltage to tolerate some amount of overvoltage, in order to promote high efficiency by refraining from dissipating energy in transistor 120 and resistor 128.

Circuitry 100 may advantageously be located at or near the terminals of electric motor 14. Circuitry 100 may also advantageously be packaged within housing 59 of electric motor 14, such as on a circuit board packaged within housing 59 of electric motor 14.

In the event of very high levels of back emf (electromotive force) that may be generated by electric motor 14 say, in an uncontrolled situation, such back emf may be large enough (above the expected operating voltages within in circuitry 100) damage various components in circuitry 100. As such, one or more fuses 111a, 111b, 111c, 111d, 111e and/or 111f may be placed at locations within circuitry 100, as shown in FIG. 2.

Figure 7:
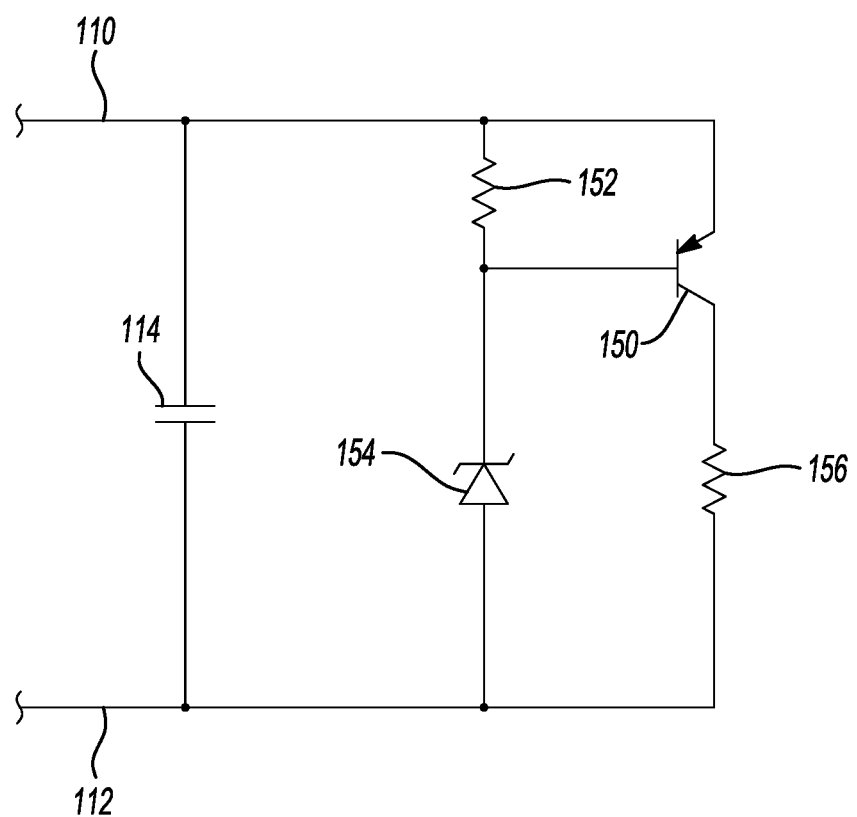
FIG. 7 illustrates a variation of the overvoltage mitigation circuitry shown in FIG. 2.

A variation on circuitry 100 is illustrated in FIG. 7. Here, a transistor 150 may be provided in place of transistor 120 of FIG. 2. Transistor 150 may be a p-type bipolar transistor or a p-channel MOSFET. A voltage-limiting or voltage-clamping diode 154 (or alternatively, a series connection of two or more voltage-limiting or voltage-clamping diodes) is provided, coupled to negative output 112 of rectifier 102 and, via resistor 152, to positive output 110 of rectifier 102. A resistor 156 dissipates energy stored in capacitor 114 when transistor 150 conducts. Resistor 156 may also be omitted if transistor 150 is capable of dissipating sufficient energy.

Figure 3:
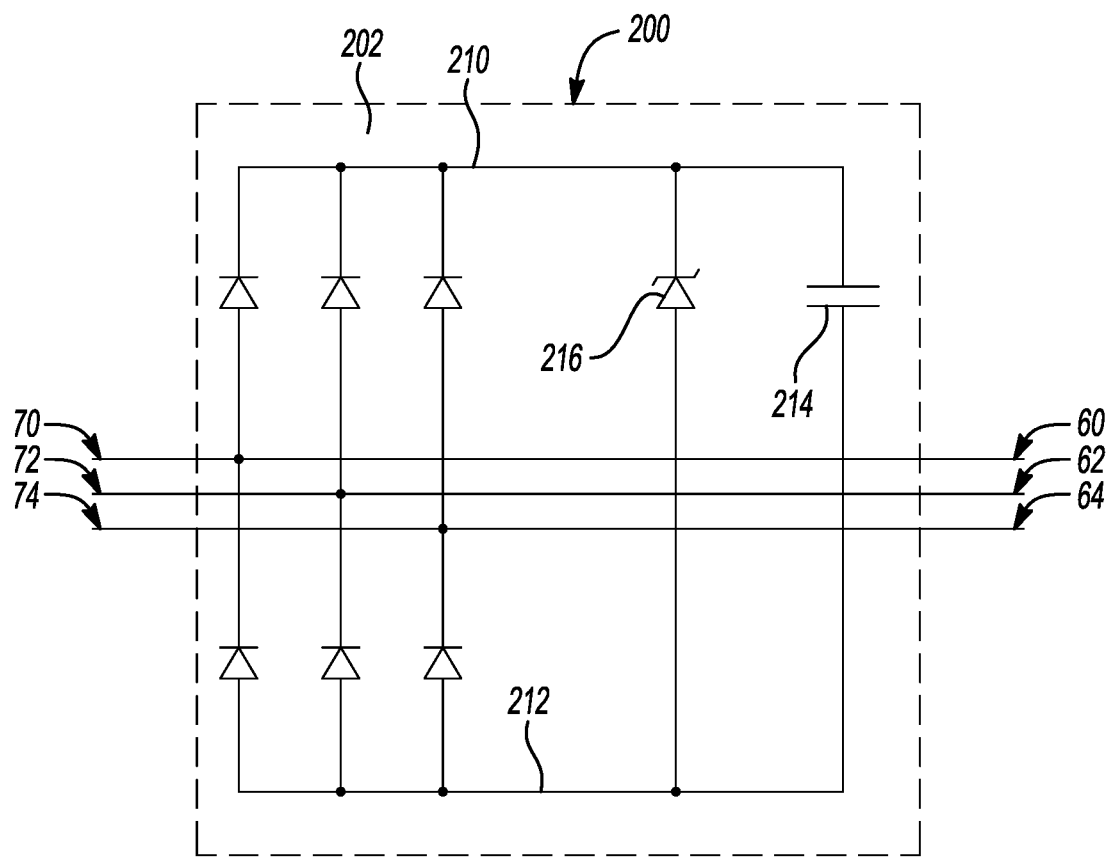
FIG. 3 is an electrical schematic drawing showing an overvoltage mitigation circuit for the powertrain of the electric vehicle.

As alternative circuitry to circuitry 100, circuitry 200 for overvoltage mitigation, overvoltage suppression, or overvoltage filtering is illustrated in FIG. 3. Circuitry 200 may also be coupled to first conductor 70, second conductor 72, and third conductor 74 and to first phase input 60, second phase input 62, and third phase input 64 of electric motor 14.

Circuitry 200 may include a rectifier 202, which may be a three-phase bridge rectifier. The six diodes comprising rectifier 202 may be any suitable diodes for voltage rectification, such as Schottky diodes. Rectifier 202 may have a first rectifier output 210, which may be a positive rectifier output, and a second rectifier output 212, which may be a negative rectifier output. The result of rectification by rectifier 202 may be a direct-current (DC) voltage between first rectifier output 210 and second rectifier output 212. Further included in circuitry 200 is a capacitor 214, which may serve as an energy storage element.

Circuitry 200 may also include a diode 216 coupled between first rectifier output 210 and second rectifier output 212. Diode 216 may be a voltage-limiting or voltage-clamping diode, such as a Zener diode or TVS diode. Diode 216 may also be replaced by two or more diodes in series "head-to-tail", with their clamping or regulation voltages thereby being additive to sum to an overall desired clamping or regulation voltage, without departing from the spirit or scope of this disclosure.

Circuitry 200 will act to store energy via capacitor 214, thereby not dissipating energy, until the voltage at first rectifier output 210 exceeds the conduction voltage of diode 216. At that point the excess energy may dissipate via the conduction of diode 216. This has the considerable advantage of having limited energy dissipation until overvoltage suppression or mitigation is actually needed, and high overall efficiency.

Circuitry 200 may advantageously be located at or near the terminals of electric motor 14. Circuitry 200 may also advantageously be packaged within housing 59 of electric motor 14, such as on a circuit board packaged within housing 59 of electric motor 14.

Figure 4:
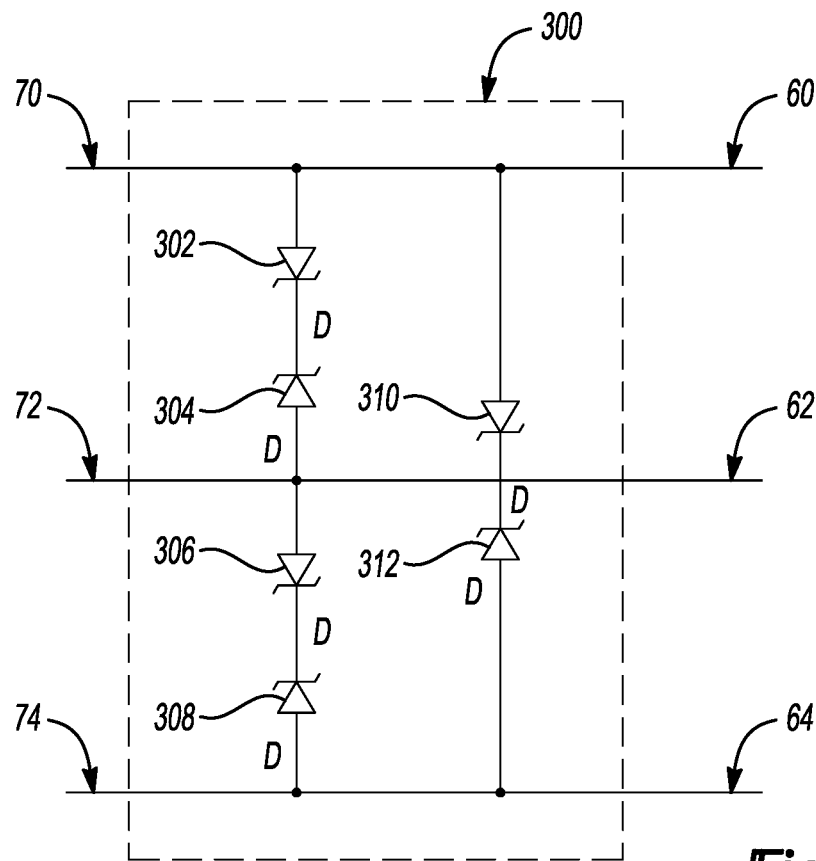
FIG. 4 is an electrical schematic drawing showing an alternative overvoltage mitigation circuit for the powertrain of the electric vehicle.

As an alternative to circuitry 100 and circuitry 200, circuitry 300 is illustrated in FIG. 4. As with circuitry 100 and circuitry 200, circuitry 300 may be coupled to first conductor 70, second conductor 72 and third conductor 74, and to first phase input 60, second phase input 62, and third phase input 64 of electric motor 14. Circuitry 300 includes six diodes, diode 302, diode 304, diode 306, diode 308, diode 310 and diode 312. The diodes may voltage limiting, voltage clamping, or voltage regulation diodes such as Zener or TVS diodes. Diode 302 and diode 304 may be coupled in series across first conductor 70 and second conductor 72. Diode 302 and diode 304 may be coupled with opposite polarities to one another (that is, anode to anode or cathode to cathode). As such, diode 302 and diode 304 act to provide bidirectional clamping or bidirectional voltage limitation to suppress or mitigate overvoltage across first conductor 70 and second conductor 72.

Diode 306 and diode 308 perform similar bidirectional clamping or bidirectional voltage limitation to suppress overvoltage across first conductor 72 and second conductor 74. Further, diode 310 and diode 312 perform a similar function in suppressing overvoltage across first conductor 70 and third conductor 74.

An advantage of circuitry 300 is that it may have a minimum number of discrete electronic components among the overvoltage suppression or mitigation mechanisms disclosed in this disclosure. Circuitry 300 may advantageously be located at or near the terminals of electric motor 14. Circuitry 300 may also advantageously be packaged within housing 59 of electric motor 14, such as on a circuit board packaged within housing 59 of electric motor 14.

Each of diodes 302, 304, 306, 308, 310, and 312 may be replaced by two or more diodes in series with their polarities aligned (the diodes configured "head to tail" or anode to cathode) to effectively form one diode in combination, without departing from the spirit of this disclosure.

Figure 5:
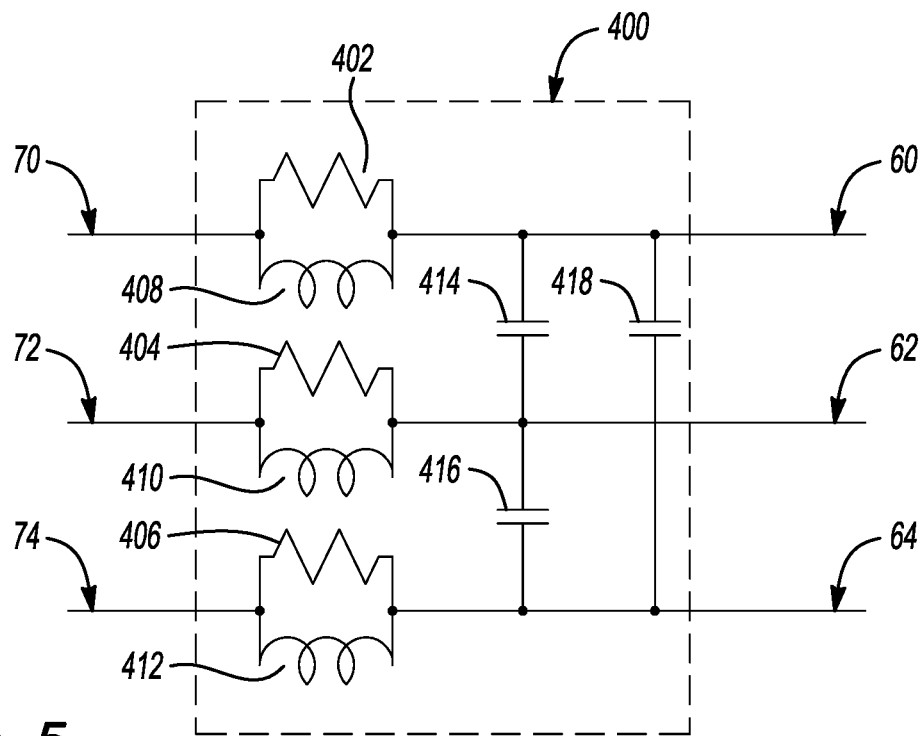
FIG. 5 is an electrical schematic drawing showing another alternative overvoltage mitigation circuit for the powertrain of the electric vehicle.

As an alternative to circuitry 100, circuitry 200 and circuitry 300, circuitry 400 is illustrated in FIG. 5. Circuitry 400 may be coupled to first conductor 70, second conductor 72 and third conductor 74, and to first phase input 60, second phase input 62, and third phase input 64 of electric motor 14. Circuitry 400 includes resistor 402, resistor 404, resistor 406, inductor 408, inductor 410, inductor 412, capacitor 414, capacitor 416, and capacitor 418. Circuitry 400 may be located near the phase outputs of PIM 18.

Resistor 402 and inductor 408 may be coupled in parallel with each other and interposed in-line in first conductor 70. Capacitor 414 may be disposed across first conductor 70 and second conductor 72. As such, resistor 402, inductor 408 and capacitor 414 may form a resistor-inductor-capacitor (RLC) filter. Resistor 404, inductor 410, and capacitor 416 may form a second RLC filter. The values of these components may be similar to or the same as the values of resistor 402, inductor 408, and capacitor 414. Resistor 406, inductor 412, and capacitor 418 may form a third RLC filter, disposed between first conductor 70 and third conductor 74. The values of these components may be similar to or the same as the values of resistor 402, inductor 408, and capacitor 414.

These RLC filters may act with respect to voltage transients that appear across first conductor 70, second conductor 72, and third conductor 74. This may both serve to limit voltage overshoot and dv/dt (time rate of change of voltage) in the three-phase system that comprises first conductor 70, second conductor 72, and third conductor 74. The inductance of inductor 408 and the capacitance of capacitor 414 (and that of the other LC pairs) may be selected so that their LC natural frequency is somewhat lower than the natural frequency of the distributed capacitance and inductance of the cable that includes first conductor 70, second conductor 72 and third conductor 74. The inductances and capacitances may also be selected to limit the dv/dt to as low a value as desired. Resistors 402, 404, and 406 may be selected to critically damp the step response of the RLC circuits. Inductors 408, 410, and 412 may be of very small inductance, and having the corresponding resistors 402, 404, and 406 in parallel may limit the energy losses involved.

Figure 6:
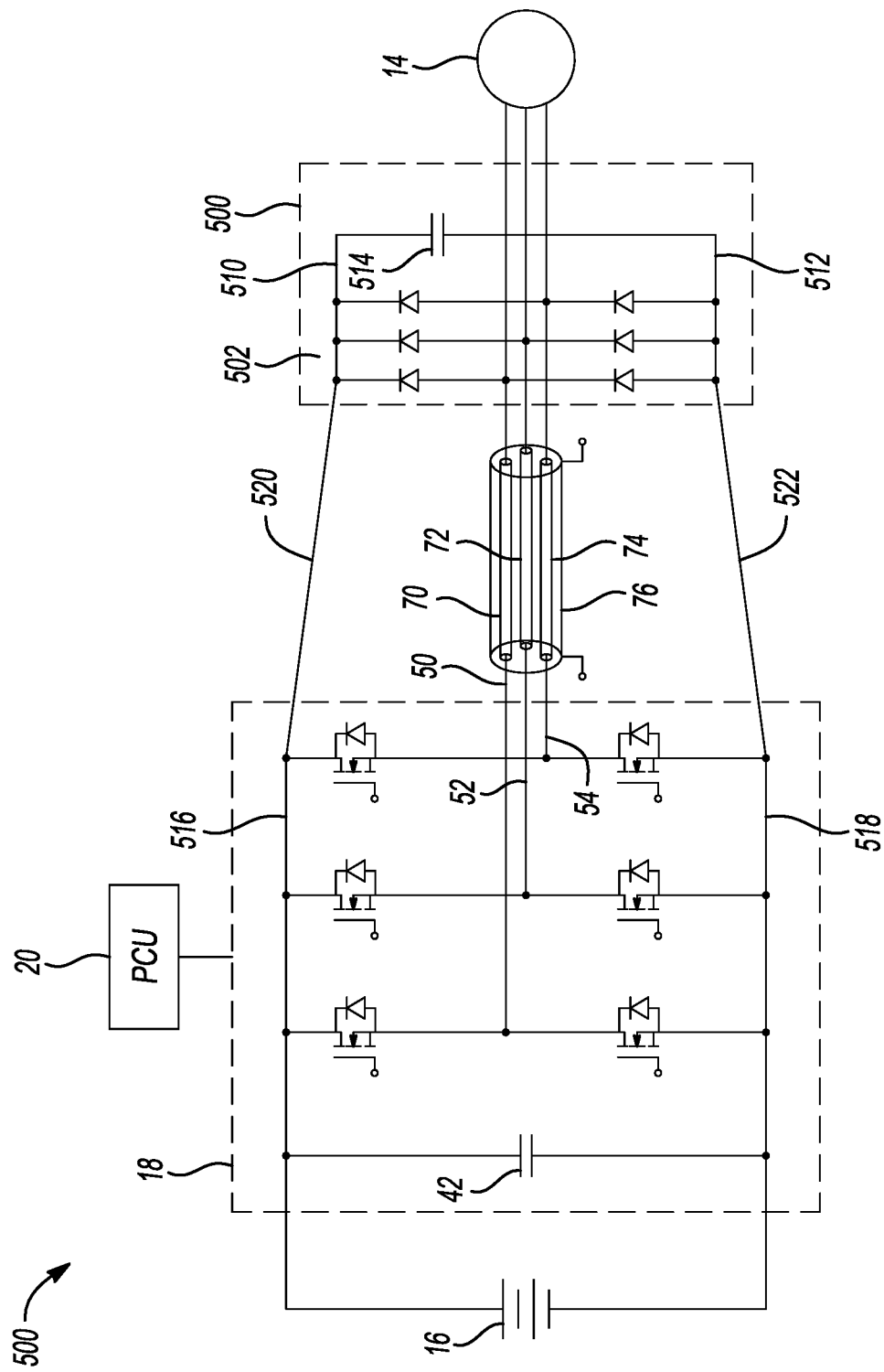
FIG. 6 is an electrical schematic drawing showing another overvoltage mitigation circuit for the powertrain of the electric vehicle.

As alternative circuitry to circuitry 100, circuitry 200 and circuitry 300 and circuitry 400, circuitry 500 is illustrated in FIG. 6. Here, circuitry 500 includes rectifier 502, which may be a three-phase diode bridge rectifier. The six diodes comprising rectifier 502 may be any suitable diodes for voltage rectification, such as Schottky diodes. Coupled across first rectifier output 510 and second rectifier output 512 may be a capacitor 514, which may act as an energy storage element. Further, first rectifier output 510 may be coupled to positive rail 516 of PIM 18 by a conductor 520. Additionally, second rectifier output 512 may be coupled to negative rail 518 of PIM 18 by a conductor 522. Conductor 520 and conductor 522 may be small-gauge DC cables. That is, conductor 520 and conductor 522 may not need to be selected for advantageous high-frequency or high-current properties. Conductor 520 and conductor 522, for instance, may be 12 AWG (American wire gauge) wires. Capacitor 514 may help limit voltage overshoot in first conductor 70, second conductor 72 and third conductor 74 while managing energy losses and allowing use of simpler cable containing those conductors (that is, avoiding the need for twisted pair or coaxial cable).

There are numerous advantages of the overvoltage mitigation designs disclosed herein. They comprise passive, low-loss components and may be easy to integrate within the housing of electric motor 14 if so desired. Additionally, in some embodiments, the designs embody simply passive components. Further, the overvoltage mitigation designs do not need to embody control or sensing mechanisms.

It should also be noted that circuitry 100, 200, 300, 400 and/or 500 may be used in combination in an overvoltage mitigation design. They may be located near or within PIM 18 and/or near or within electric motor 14.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure.

Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims. Moreover, this disclosure expressly includes combinations and sub-combinations of the elements and features presented above and below.

What is claimed is:

1. An electric motor control system comprising:
an alternating current (AC) electric motor having a first phase input, a second phase input, and a third phase input;
an AC electrical energy source having a first phase output, a second phase output and a third phase output;
a first conductor coupled between the first phase output of the AC electrical energy source and the first phase input of the AC electric motor;
a second conductor coupled between the second phase output of the AC electrical energy source and the second phase input of the AC electric motor;
a third conductor coupled between the third phase output of the AC electrical energy source and the third phase input of the AC electric motor; and
circuitry that further includes:
a rectifier with a first rectifier phase input coupled to the first conductor, a second rectifier phase input coupled to the second conductor, and a third rectifier phase input coupled to the third conductor, the rectifier producing a rectified voltage between a positive rectifier output and a negative rectifier output;
an energy storage element coupled across the positive rectifier output and the negative rectifier output; and
at least one voltage limiting diode coupled to the positive rectifier output to limit a voltage of the positive rectifier output.

2. The electric motor control system of claim 1, wherein the at least one voltage limiting diode is coupled across the positive rectifier output and the negative rectifier output.

3. The electric motor control system of claim 2, wherein the at least one voltage limiting diode comprises at least one transient-voltage-suppression (TVS) diode.

4. The electric motor control system of claim 1, wherein:
the circuitry further includes a transistor having a control input and configured to conduct current between the positive rectifier output and the negative rectifier output in response to a control voltage at the control input; and
the at least one voltage limiting diode is operative to provide control voltage to the control input.

5. The electric motor control system of claim 4, wherein the circuitry further includes a resistor through which the current is conducted.

6. The electric motor control system of claim 4, wherein the control input is a gate of the transistor.

7. The electric motor control system of claim 4, wherein the transistor is a bipolar junction transistor and the control input is a base of the transistor.

8. The electric motor control system of claim 1, wherein:
the AC electrical energy source comprises a source of stored electrical energy and an inverter coupled to the source of electrical energy; and
the circuitry further comprises a fourth conductor coupled between a positive rail of the inverter and the positive rectifier output and a fifth conductor coupled between a negative rail of the inverter and the negative rectifier output.

9. An electric motor control system comprising:
an AC electric motor having a first phase input, a second phase input, and a third phase input;
an AC electrical energy source having a first phase output, a second phase output and a third phase output;
a first conductor coupled between the first phase output and the first phase input;
a second conductor coupled between the second phase output and the second phase input;
a third conductor coupled between the third phase output and the third phase input;
first overvoltage mitigation circuitry coupled across the first conductor and the second conductor;
second overvoltage mitigation circuitry coupled across the first conductor and the third conductor; and
third overvoltage mitigation circuitry coupled across the second conductor and the third conductor.

10. The electric motor control system of claim 9, wherein the AC electrical energy source further comprises:
a source of stored electrical energy; and
an inverter coupled to the source of stored electrical energy and having the first phase output, the second phase output, and the third phase output.

11. The electric motor control system of claim 10, wherein the first overvoltage mitigation circuitry comprises a first diode and a second diode, the first diode and the second diode coupled in series with each other and with opposing polarities to one another.

12. The electric motor control system of claim 11, wherein the first diode is a TVS diode.

13. The electric motor control system of claim 12, wherein the second diode is a TVS diode.

14. The electric motor control system of claim 10, wherein the first overvoltage mitigation circuitry comprises:
a parallel connected resistor and inductor interposed in-line in the first conductor; and
a capacitor coupled across the first conductor and the second conductor.

15. The electric motor control system of claim 14, wherein the resistor, inductor, and capacitor are all located closer to the inverter than to the AC electric motor.

16. The electric motor control system of claim 11, wherein the first overvoltage mitigation circuitry is located closer to the AC electric motor than to the inverter.

17. An electric vehicle comprising:
an alternating current (AC) electric motor having a first phase input, a second phase input, and a third phase input;
an AC electrical energy source having a first phase output, a second phase output and a third phase output;
a first conductor coupled between the first phase output of the AC electrical energy source and the first phase input of the AC electric motor;

a second conductor coupled between the second phase output of the AC electrical energy source and the second phase input of the AC electric motor;

a third conductor coupled between the third phase output of the AC electrical energy source and the third phase input of the AC electric motor; and circuitry that further includes:

a rectifier with a first rectifier phase input coupled to the first conductor, a second rectifier phase input coupled to the second conductor, and a third rectifier phase input coupled to the third conductor, the rectifier producing a rectified voltage between a positive rectifier output and a negative rectifier output;

an energy storage element coupled across the positive rectifier output and the negative rectifier output;

at least one voltage limiting diode coupled to the negative rectifier output to limit a voltage between the positive rectifier output and the negative rectifier output; and a transistor having a control input and configured to conduct current between the positive rectifier output and the negative rectifier output in response to a control voltage at the control input; wherein the at least one voltage limiting diode is operative to provide control voltage to the control input.

18. The electric vehicle of claim 17, wherein the transistor is a p-channel bipolar transistor or a p-channel MOSFET.

19. The electric vehicle of claim 17, wherein the at least one voltage limiting diode comprises a TVS diode or a Zener diode.

20. The electric vehicle of claim 17, further comprising a resistor through which the current is conducted.

* * * * *